United States Patent
Zhang et al.

(10) Patent No.: US 12,380,284 B2
(45) Date of Patent: Aug. 5, 2025

(54) TEXT TRANSLATION METHOD AND APPARATUS, ELECTRONIC DEVICE, AND STORAGE MEDIUM

(71) Applicant: Beijing Baidu Netcom Science and Technology Co., Ltd., Beijing (CN)

(72) Inventors: Ruiqing Zhang, Beijing (CN); Hui Liu, Beijing (CN); Xiyang Wang, Beijing (CN); Zhongjun He, Beijing (CN); Zhi Li, Beijing (CN); Hua Wu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 289 days.

(21) Appl. No.: 18/121,351

(22) Filed: Mar. 14, 2023

(65) Prior Publication Data
US 2023/0342560 A1    Oct. 26, 2023

(30) Foreign Application Priority Data

Apr. 26, 2022 (CN) .......................... 202210446882.9

(51) Int. Cl.
*G06F 40/47* (2020.01)
*G06F 40/166* (2020.01)
*G06F 40/30* (2020.01)
*G06F 40/247* (2020.01)

(52) U.S. Cl.
CPC ............ *G06F 40/47* (2020.01); *G06F 40/166* (2020.01); *G06F 40/30* (2020.01); *G06F 40/247* (2020.01)

(58) Field of Classification Search
USPC ....................................................... 704/2–7
See application file for complete search history.

(56) References Cited

U.S. PATENT DOCUMENTS

| | | | |
|---|---|---|---|
| 2014/0358519 A1* | 12/2014 | Mirkin | G06F 40/47 704/2 |
| 2016/0350290 A1* | 12/2016 | Fujiwara | G06F 40/51 |
| 2017/0220561 A1* | 8/2017 | Fujiwara | G06F 40/45 |
| 2018/0082681 A1* | 3/2018 | Fujiwara | G06F 40/45 |
| 2018/0089169 A1* | 3/2018 | Yamauchi | G06F 40/151 |

(Continued)

FOREIGN PATENT DOCUMENTS

| | | |
|---|---|---|
| CN | 107168958 A | 9/2017 |
| CN | 107608973 A | 1/2018 |

(Continued)

OTHER PUBLICATIONS

The State Intellectual Property Office of the People's Republic of China, Office Action in corresponding Chinese Application No. 202210446882.9 dated Nov. 7, 2022.

*Primary Examiner* — Leonard Saint-Cyr
(74) *Attorney, Agent, or Firm* — Leydig, Voit & Mayer, Ltd.

(57) ABSTRACT

A text translation method is described that includes initially acquiring text. Thereafter, first text is determined in the initial text; and second text is determined according to the first text, where the second text is used for describing the first text. Additionally, initial text is translated to obtain initial translation text, and the second text is translated to obtain description translation text. Thereafter, the initial translation text is updated according to the description translation text to obtain target translation text of the initial text.

17 Claims, 6 Drawing Sheets

(56) References Cited

U.S. PATENT DOCUMENTS

| | | | | |
|---|---|---|---|---|
| 2018/0365234 A1* | 12/2018 | Imade | ................... | G06F 40/42 |
| 2019/0188842 A1* | 6/2019 | Sakamoto | ................ | G06T 7/62 |
| 2023/0120230 A1* | 4/2023 | Ruokonen | ............... | G06F 40/51 |
| | | | | 704/2 |

FOREIGN PATENT DOCUMENTS

| | | |
|---|---|---|
| CN | 107885737 A | 4/2018 |
| CN | 109558597 A | 4/2019 |
| CN | 109558604 A | 4/2019 |

* cited by examiner

TEXT TRANSLATION METHOD AND APPARATUS, ELECTRONIC DEVICE, AND STORAGE MEDIUM

CROSS-REFERENCE TO RELATED APPLICATION

This application claims priority to Chinese Patent Application No. CN202210446882.9, filed on Apr. 26, 2022, the disclosure of which is incorporated herein by reference in its entirety.

TECHNICAL FIELD

The present disclosure relates to the field of text processing and, in particular, to the fields of intelligent search, artificial intelligence, and deep learning. For example, the present disclosure relates to a text translation method and apparatus, an electronic device, and a storage medium.

BACKGROUND

With the development of the Internet, people are no longer satisfied with acquiring information from materials in a single language and begin to pay more attention to information acquisition from materials in other languages. Therefore, it is necessary to implement cross-language information acquisition with the help of an automatic machine translation system.

Language evolves over time. The accuracy of machine translation determines whether people can acquire information accurately.

SUMMARY

The present disclosure provides a text translation method and apparatus, an electronic device, and a storage medium.

According to an aspect of the present disclosure, a text translation method is provided. The method includes the steps below.

Initial text is acquired, and first text is determined in the initial text.

Second text is determined according to the first text. The second text is used for describing the first text.

The initial text is translated to obtain initial translation text, and the second text is translated to obtain description translation text.

The initial translation text is updated according to the description translation text to obtain target translation text of the initial text.

According to an aspect of the present disclosure, a text translation apparatus is provided. The apparatus includes an initial text acquisition module, a description text acquisition module, a text translation module, and a translation text updating module.

The initial text acquisition module is configured to acquire initial text and determine first text in the initial text.

The description text acquisition module is configured to determine second text according to the first text. The second text is used for describing the first text.

The text translation module is configured to translate the initial text to obtain initial translation text and translate the second text to obtain description translation text.

The translation text updating module is configured to update the initial translation text according to the description translation text to obtain target translation text of the initial text.

According to another aspect of the present disclosure, an electronic device is provided. The electronic device includes at least one processor and a memory communicatively connected to the at least one processor.

The memory stores an instruction executable by the at least one processor. The instruction is executed by the at least one processor to cause the at least one processor to perform the text translation method according to any embodiment of the present disclosure.

According to another aspect of the present disclosure, a non-transitory computer-readable storage medium is provided. The storage medium stores a computer instruction for causing a computer to perform the text translation method according to any embodiment of the present disclosure.

According to another aspect of the present disclosure, a computer program product is provided. The computer program product includes a computer program. When the computer program is executed by a processor, the text translation method according to any embodiment of the present disclosure is performed.

Embodiments of the present disclosure can improve the accuracy of text translation.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solutions and not to limit the present disclosure. In the drawings.

DETAILED DESCRIPTION

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

Figure 1:
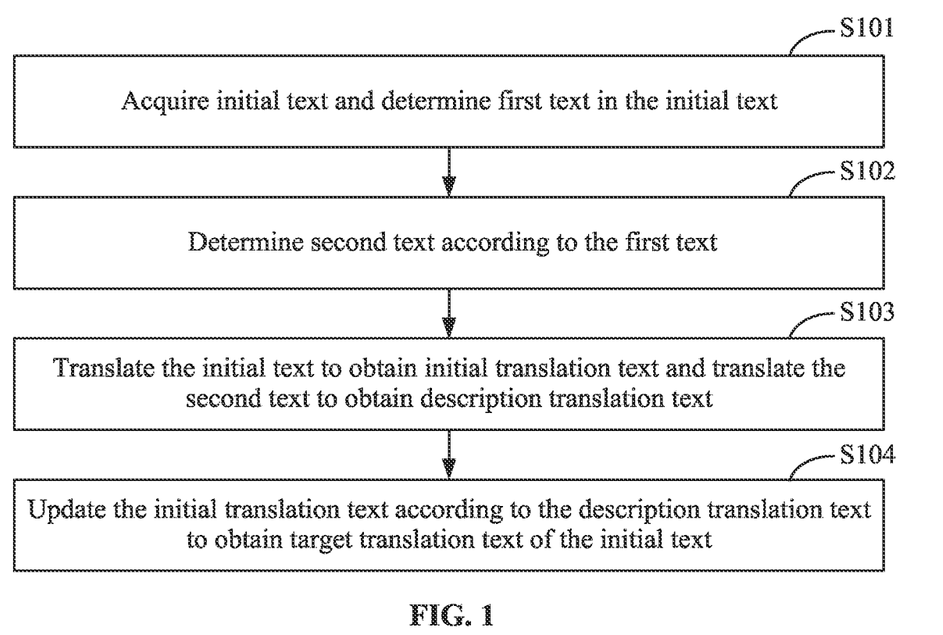
FIG. 1 is a flowchart of a text translation method according to an embodiment of the present disclosure.

FIG. 1 is a flowchart of a text translation method according to an embodiment of the present disclosure. This embodiment is applicable to the case of text translation. The method of this embodiment can be performed by a text translation apparatus. The apparatus may be implemented by software and/or hardware and is specifically configured in an electronic device having a certain data computing capability. The electronic device may be a client device or a server device. The client device is, for example, a mobile phone, a tablet computer, an in-vehicle terminal, or a desktop computer.

In S101, initial text is acquired, and first text is determined in the initial text.

The initial text is to-be-translated text. The initial text may include at least one of the following: text in a query statement document and the like. Exemplarily, the initial text may be acquired through an input of a user. For example, the initial text may be text directly input by the user or may be text obtained by recognizing a voice input by the user. Additionally, the initial text may also be extracted from a published document. The initial text may generally include at least one of the following: a character, a word, a statement, and the like. The initial text may include the first text. The first text may be the same as the initial text and may also be part of the initial text. The first text may include at least one of the following: a character, a word, a statement, and the like. At least one piece of first text may be included. At least one piece of first text may be determined in the initial text. The first text may refer to text whose meaning is difficult to determine or text whose meaning is prone to an error. Exemplarily, the first text may refer to text having multiple meanings, for example, a polysemant. Alternatively, the first text may be text having a newly derived meaning, for example, a new word, an Internet slang, or a hot word.

In a specific example, the initial text is a statement. The first text is a word. The initial text is acquired, word segmentation is performed on the initial text, and at least one word is selected from the obtained words and determined as the first text. For a selection manner, a lexicon including words whose meanings are difficult to determine may be pre-established, and a word that is among the obtained words and the same as a word in the lexicon is determined as the first text.

In S102, second text is determined according to the first text. The second text is used for describing the first text.

The second text is used for describing the first text. For example, the second text is used for defining a meaning of the first text so as to distinguish a correct meaning of the first text in the initial text from a wrong meaning of the first text in the initial text, thereby assisting in translating the first text and correcting a translation result of the first text in the translation of the initial text. The second text includes description text of the first text. The description text is used for assisting in translating the first text. The description text may refer to text describing the first text. The description text may be the same as the second text or may be text formed by adding content on the basis of the description text, where the added content may be the first text.

Exemplarily, the description text may have the same meaning as the first text. That is, the description text may be synonymous text of the first text. In another example, the description text is definitive text of the first text. The definitive text is used for defining the first text. The definitive text may include, for example, a function, origin, field or development course of first text content. Exemplarily, the first text is "饭圈". The second text includes synonymous text "粉丝圈子" of "饭圈". The second text may be "饭圈又称为粉丝圈子". Alternatively, the second text includes definitive text "追星的新名词" of "饭圈". The second text may be "饭圈是追星的 新名词".

The step in which the second text is determined according to the first text may be that a near-synonym of the first text, a synonym of the first text, and a similar word of the first text are queried and determined as the description text and that the second text is generated. Alternatively, this step may also be that paraphrase content of the first text is queried, that text is extracted from the paraphrase content and determined as the description text, and that the second text is generated.

In S103, the initial text is translated to obtain initial translation text, and the second text is translated to obtain description translation text.

The initial translation text is text obtained by translating the initial text and is generally text obtained through machine translation. The description translation text is text obtained by translating the second text and is generally text obtained through machine translation. A translation method may include, for example, a rule-based translation method, a corpus-based translation method, or a hybrid translation method. Exemplarily, text may be translated using a pre-trained neural network model, for example, a transformer model. The initial text includes the first text. The initial translation text includes the translation of the first text. The initial text and the second text may be translated synchronously or asynchronously.

In S104, the initial translation text is updated according to the description translation text to obtain target translation text of the initial text.

The description translation text is used for updating the initial translation text and, specifically, for updating the translation of the first text so as to correct the wrong translation of the first text. It is to be noted that an update may be a replacement or a rewrite. The replacement may be that word segmentation is performed on the initial translation text by using a rule-based replacement manner to obtain the translation of the first text and that the initial translation text is replaced with the description translation text. The rewrite may be implemented by using a pre-trained machine learning model. For example, the description translation text and the initial translation text are input into a model to obtain the target translation text output by the rewriting model. Exemplarily, the model may be a transformer model. The initial translation text is updated to obtain the target translation text. The target translation text serves as the most accurate translation text of the initial text. After the target translation text is obtained, the target translation text may be provided for the user, or back translation and the like may also be performed.

In the related art, when some words, such as new words, hot words, and some language and culture derivatives, are translated literally, the obtained results are different from actual meanings of the words, leading to translation errors. In the related art, such words need to be pre-collected manually, translated manually, and added to the corpus so as to be translated accurately.

According to technical solutions of the present disclosure, the first text in the initial text is acquired, and the second text generated by the description text corresponding to the first text is acquired. The initial text and the second text are translated separately. The initial translation text obtained by translating the initial text is updated based on the description translation text obtained by translating the second text to obtain the target translation text of the initial text. With this arrangement, the translation of the first text in the initial translation text can be updated based on the description content of the first text and the correspondingly-obtained description translation text so that the translation of the first text is determined accurately in the initial translation text, improving the accuracy of the translation of the first text, thereby improving the translation accuracy of the target translation text, reducing the cost of manual translation, and improving the timeliness and efficiency of translation.

Figure 2:
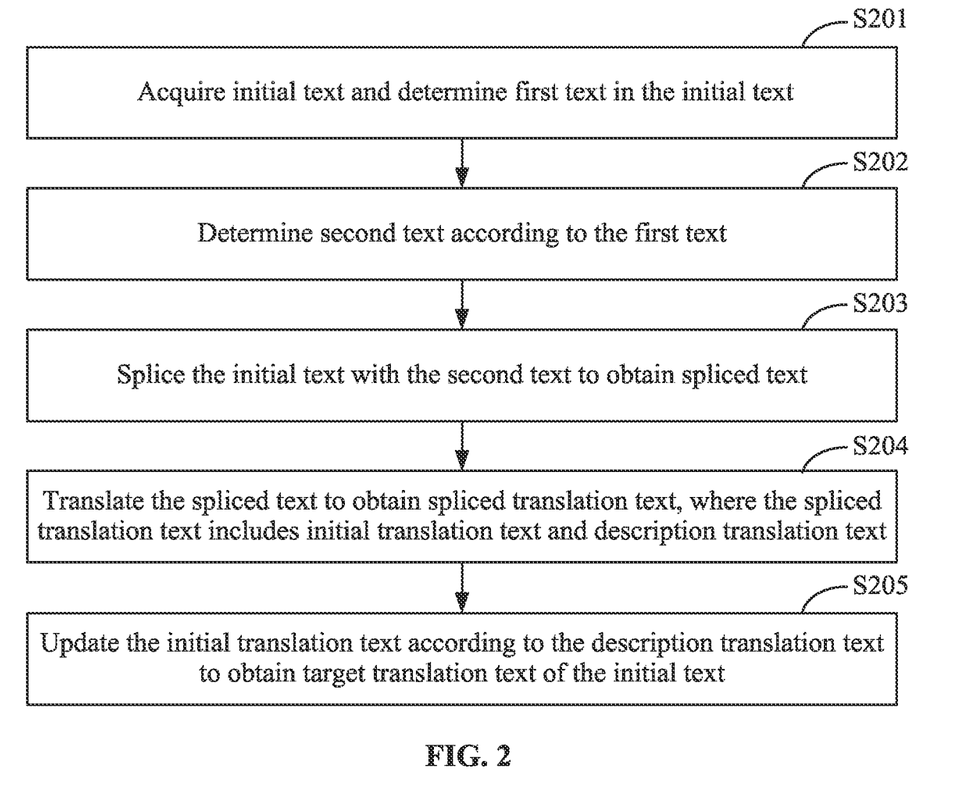
FIG. 2 is a flowchart of another text translation method according to an embodiment of the present disclosure.

FIG. 2 is a flowchart of another text translation method according to an embodiment of the present disclosure. This embodiment is an optimization and expansion of the preceding technical solutions and can be combined with each preceding optional embodiment. The step in which the initial text is translated to obtain the initial translation text and the second text is translated to obtain the description translation text is specifically that the initial text is spliced with the second text to obtain spliced text and that the spliced text is translated to obtain spliced translation text. The spliced translation text includes the initial translation text and the description translation text.

In S201, initial text is acquired, and first text is determined in the initial text.

In S202, second text is determined according to the first text. The second text is used for describing the first text.

In S203, the initial text is spliced with the second text to obtain spliced text.

The spliced text includes the initial text and the second text. The spliced text is used for translating the initial text and the second text simultaneously. A splicing manner may be that the initial text and the second text are placed in the same statement or the same paragraph and are separated by a symbol separating pieces of text. The symbol is used for separating the initial text and the second text before and after translation, guaranteeing that when the initial text and the second text are translated, the meaning of the initial text and the meaning of the second text do not interfere with each other. Exemplarily, the symbol may be, for example, a comma or a full stop. For example, the second text is placed behind the initial text and is separated from the initial text by a comma. In a specific example, the initial text is " 去年就想来了, 今天终于拔草 了". The first text is "拔草". The second text is "消除欲望". The spliced text is "去年就想来了, 今天终于拔草了, 拔草是消除欲望".

In S204, the spliced text is translated to obtain spliced translation text. The spliced translation text includes initial translation text and description translation text.

The spliced text is translated so that the initial text and the second text are translated simultaneously. The spliced translation text is the translation of the spliced text. The spliced translation text includes the initial translation text obtained by translating the initial text and the description translation text obtained by translating the second text.

In fact, the meaning of the initial text and the meaning of the second text are not mixed in the spliced text. Therefore, when the spliced text is translated, the initial text and the second text are translated independently to form the spliced translation text. The spliced translation text includes the initial translation text and the description translation text. The initial translation text is the translation of the initial text. The description translation text is the translation of the second text. In the spliced translation text, a splicing structure of the initial translation text and the description translation text may be the same as that of a splicing result of the initial text and the second text. For example, the initial text and the second text are placed in the same statement and separated by a comma, the initial translation text and the description translation text are placed in the same statement and separated by a comma, and the sequence of the initial translation text and the description translation text in the same statement is the same as the sequence of the initial text and the second text in the same statement.

In S205, the initial translation text is updated according to the description translation text to obtain target translation text of the initial text.

The step in which the initial translation text is updated according to the description translation text is actually that the initial translation text included in the spliced translation text is updated according to the description translation text included in the spliced translation text so as to obtain the target translation text of the initial text. With this arrangement, the processing of two pieces of text is converted into the synchronous processing of one piece of text, simplifying the translation operation and improving translation efficiency. Moreover, compared with the case where the second text and the initial text are translated separately, and an association relationship between two translations needs to be established manually or through an additional operation, increasing translation complexity, the synchronous translation of the spliced text can reduce translation complexity and improve translation efficiency.

Optionally, the step in which the initial translation text is updated according to the description translation text to obtain the target translation text of the initial text includes that the initial translation text in the spliced translation text is rewritten according to the description translation text included in the spliced translation text to obtain the target translation text of the initial text.

The step in which the initial translation text in the spliced translation text is rewritten according to the description translation text included in the spliced translation text may be understood as rewriting the spliced translation text to obtain the target translation text or rewriting the initial translation text according to the description translation text. As for rewriting the initial translation text according to the description translation text, the description translation text needs to be eliminated additionally so that the rewritten initial translation text is obtained and determined as the target translation text. The step in which the initial translation text in the spliced translation text is rewritten according to the description translation text included in the spliced translation text is actually that the translation of the first text in the initial translation text is corrected according to the description translation text. However, a case exists where the first text and the second text are not synonyms, and in this case, a replacement cannot be performed directly because a direct replacement may lead to a grammatical error in the corrected initial translation text. Therefore, the initial translation text is rewritten to obtain the corrected translation of the first text. Moreover, a statement conforming to the grammatical norms is determined as a target translation statement.

In a specific example, the initial text is " 饭圈文化毒害了青少年 一代", and the second text is " 饭圈指粉丝圈子的简称". Correspondingly, the initial translation text is that "Rice circle culture has poisoned the younger generation", and the description translation text is that "Rice circle is short for fan group". Since the first text is "饭圈". A result obtained through a direct replacement is text "Is short for fan group culture has poisoned the younger generation". The grammar of the text does not conform to English norms, making the text not suitable for serving as the translation. Accordingly, the initial translation text can be rewritten according to the description translation text. For example, text "The fan culture has poisoned the younger generation" is obtained through rewriting, the grammar of the text conforms to English norms, and moreover, the meaning of the translation is consistent with the meaning of the initial text.

It is to be noted that the initial text may include at least one piece of first text. Each piece of first text determines a corresponding piece of second text. Therefore, at least one piece of second text exists. The spliced text includes one piece of initial text and at least one piece of second text. In the spliced text, the initial text is placed in the first place, the second text is placed behind the initial text for splicing, and a comma is used for connecting two pieces of text in the splicing. Exemplarily, the initial text is A. The second text includes B, C, and D. The spliced text is "A, B, C, D". Correspondingly, each part in the spliced text is translated correspondingly to obtain the spliced translation text. In the spliced translation text, the initial translation text is placed in the first place, and the description translation text is placed behind the initial translation text. A comma is used for connecting the initial translation text and each piece of description translation text. Moreover, the sequence of each piece of second text is consistent with the sequence of each piece of description translation text. In another example, the initial translation text is A'. The description translation text of second text B is B'. The description translation text of second text C is C'. The description translation text of second text D is D'. The spliced translation text is "A', B', C', D'".

Additionally, the step in which the initial translation text in the spliced translation text is rewritten according to the description translation text in the spliced translation text can convert the processing of two pieces of text into the synchronous processing of one piece of text, simplifying the rewrite operation and reducing the manual intervention of establishing the relationship between the description translation text and the initial translation text in the rewrite process.

The step in which the initial translation text in the spliced translation text is rewritten through the description translation text in the same spliced translation text can simplify the rewrite operation, reduce the manual intervention of establishing the relationship between the description translation text and the initial translation text in the rewrite process, and improve translation and rewrite efficiency. Moreover, the rewriting of the initial translation text can reduce grammatical errors in the translation and improve translation accuracy.

Correspondingly, the step in which the initial translation text is updated according to the description translation text to obtain the target translation text of the initial text may include that the initial translation text and the description translation text are determined according to an arrangement sequence between the initial translation text and the description translation text in the spliced translation text and that the initial translation text is updated according to the description translation text.

Optionally, the step in which the initial translation text in the spliced translation text is rewritten according to the description translation text included in the spliced translation text to determine the target translation text of the initial text includes that the spliced translation text is input into a pre-trained rewriting model to obtain the target translation text of the initial text output and from the rewriting model.

The rewriting model is used for rewriting the initial translation text in the spliced translation text according to the description translation text in the spliced translation text. The rewriting model is a pre-trained deep learning model. For example, the rewriting model may be a transformer model. A training sample may include two pieces of text in the same language. One piece of text is the spliced translation text, and the other piece of text is the target translation text. The spliced translation text is a statement formed by splicing the initial translation text with at least one piece of description translation text. The initial translation text and the description translation text are connected through a comma.

In this embodiment, the initial translation text in the spliced translation text is rewritten based on the pre-trained rewriting model so as to finally obtain the target translation text, thereby improving translation accuracy and efficiency.

It is to be noted that the preceding translation and rewrite can be implemented through the pre-trained model. For ease of translation and rewrite, the first text in the initial text and the second text may be replaced with a corresponding placeholder. Different pieces of first text are replaced with different placeholders, thereby further simplifying the input and output of the model and enabling the first text to be recognized more accurately. Exemplarily, the initial text is "经过多次拔草，我终于对饭圈生成的周边产品失去了兴趣". The first text includes "拔草", "饭圈", and "周边产品" which are replaced with placeholder A, placeholder B, and placeholder C respectively. The replaced initial text is "经过多次A，我终于对B 生成的C 失 去 了 兴趣".

According to technical solutions of the present disclosure, the initial text is spliced with the second text to form the spliced text. The spliced text is translated to obtain the spliced translation text so that the initial text and the second text are translated synchronously. The update of the initial translation text is converted into the processing of the spliced translation text, thereby reducing the manual intervention of the initial text and the second text in the translation process. Moreover, the processing of two pieces of text is converted into the synchronous processing of one piece of text, simplifying the translation operation and improving translation efficiency.

Figure 3:
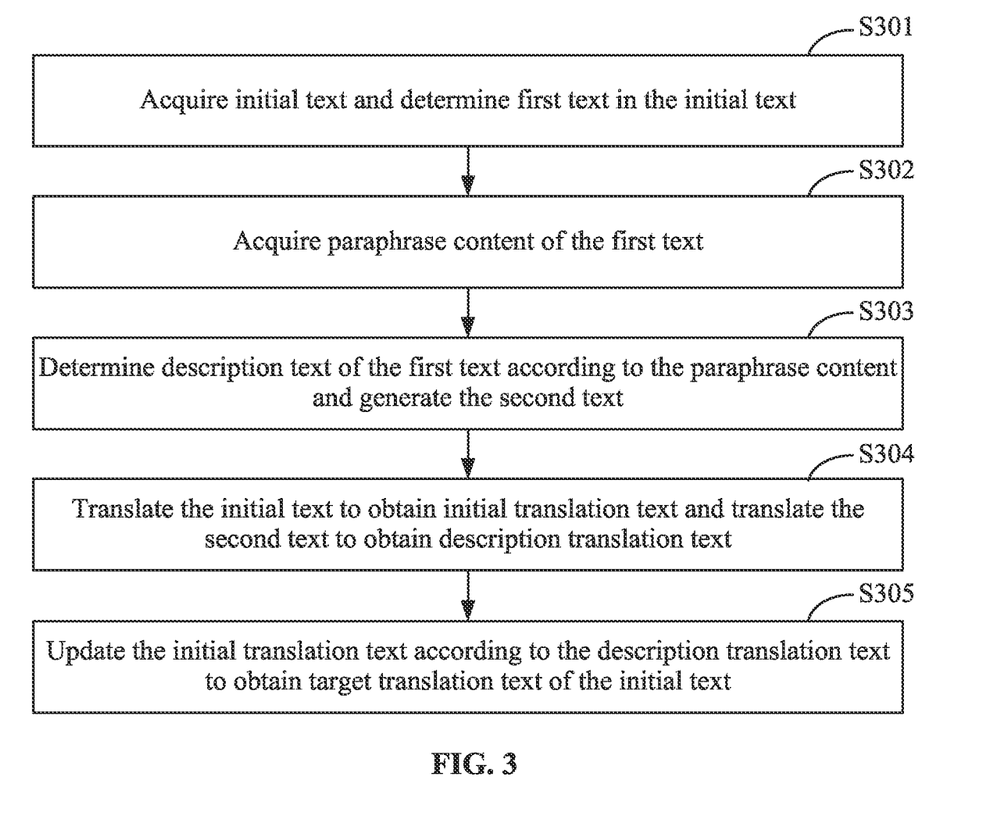
FIG. 3 is a flowchart of another text translation method according to an embodiment of the present disclosure.

FIG. 3 is a flowchart of another text translation method according to an embodiment of the present disclosure. This embodiment is an optimization and expansion of the preceding technical solutions and can be combined with each preceding optional embodiment. The step in which the second text is determined according to the first text is specifically that paraphrase content of the first text is acquired and that description text of the first text is determined according to the paraphrase content and the second text is generated.

In S301, initial text is acquired, and first text is determined in the initial text.

In S302, paraphrase content of the first text is acquired.

The paraphrase content of the first text may refer to encyclopedic knowledge associated with the first text. The paraphrase content of the first text is used for determining a meaning of the first text in the initial text so as to distinguish the meaning of the first text in the initial text from a meaning of the first text in another text and distinguish the meaning of the first text in the initial text from another meaning of the first text. The paraphrase content of the first text may include multiple meanings of the first text, for example, an original meaning and an extended meaning. The paraphrase content of the first text may also include, for example, an example statement in which each meaning is applied, an origin of each meaning, and an associated knowledge document of each meaning. Additionally, involved subject knowledge, critical information, and related policy information may also be included in the paraphrase content according to application fields of different meanings.

The paraphrase content of the first text may be acquired through a query in the network. For example, content related to the first text is searched by calling a query interface of encyclopedia knowledge and is determined as the paraphrase content of the first text.

In S303, description text of the first text is determined according to the paraphrase content, and the second text is generated.

The paraphrase content may include redundant and irrelevant information and may be processed to obtain the description text. Exemplarily, an abstract is extracted from the paraphrase content to obtain the description text. The abstract may be extracted from the paraphrase content through a pre-trained machine learning model. The pre-trained machine learning model may include, for example, a sequence-to-sequence model or a long short-term memory neural network model. Alternatively, each statement in the paraphrase content may be matched with the first text to obtain a statement matching the first text, and the statement is determined as the description text. The statement matching the first text may be a statement including the first text. Additionally, the description text may be determined from the paraphrase content according to the initial text and the first text. Since the first text may be a polysemant, the meaning of the first text in the initial text may be determined according to the initial text so that the description text of the first text is determined more accurately.

The paraphrase content of the first text may be acquired through a query in a question-answering system or through a query in a search engine. Exemplarily, a question of the first text, for example, "what does the first text mean", may be generated and input into the question-answering system. The question-answering system acquires the paraphrase content of the first text according to the question and extracts the abstract of the paraphrase content to obtain the description text of the first text.

The generation of the second text is actually that the second text is generated according to the description text of the first text. For example, the description text may be determined as the second text directly. Alternatively, the description text is processed to generate the second text. The processing is specifically that a correspondence between the description text and the first text is established to form the second text.

Optionally, the second text includes the correspondence between the first text and the description text.

The correspondence between the first text and the description text is used for determining that a relationship exists between the first text and the description text and indicating that the first text is consistent with the description text. In fact, multiple pieces of first text may exist in the initial text. A piece of description text is determined corresponding to each piece of first text, and a piece of second text is generated. Correspondingly, multiple pieces of description text and multiple pieces of second text exist. Therefore, a correspondence between a piece of first text and a piece of description text is established in a piece of second text so that it can be determined that the piece of second text is determined for which piece of first text. Therefore, multiple pieces of second text may be distinguished according to different pieces of first text. The second text includes the correspondence between the first text and the description text, which is actually equal to that the second text further includes the first text, the description text, and a conjunction describing the correspondence. The conjunction may include, for example, "是" or "用于".

Additionally, the second text includes the first text so that the first text does not need to be identified additionally in the initial text. Therefore, only text repeated in the initial text and the second text needs to be determined to serve as the first text, saving the cost of manual identification.

A specific manner of establishing the correspondence may be to establish a definitive relationship between the first text and the description text. For example, an equivalent relationship is established between the first text and the description text and is usually described by "是" (is). For example, the first text is the description text. In another example, a functional relationship is established between the first text and the description text and is usually described by "用于" (is used for). For example, the first text is used for implementing the description text. Additionally, other manners of establishing a relationship exist and may be arranged according to specific first text content and description text content. Exemplarily, the first text is "拔草". The description text is "消除欲望". The correspondence between the first text and the description text is an equivalent relationship. The second text may be "拔草是指消除欲望". In another example, the first text is "饭圈". The description text is "组织追星粉丝". The correspondence between the first text and the description text is a function-definitive relationship. The second text may be "饭圈用于组织追星粉丝".

Correspondingly, the step in which the second text is generated according to the description text of the first text may be specified below. In the case where the description text includes the correspondence between the first text and the description text, the description text is determined as the second text; alternatively, a statement template matching the correspondence is queried for in pre-established statement templates, and the first text and the description text are added to corresponding positions to form the second text. In the case where the description text includes no correspondence between the first text and the description text, the correspondence between the description text and the first text is established, and the first text and the description text are added to generate the second text. Exemplarily, the first text is "拔草", the description text is "消除欲望", neither the first text nor the correspondence between the first text and the description text exists in the description text, and the generated second text is "拔草是指消除欲望" according to the first text, the description text, and the correspondence between the first text and the description text. In another example, the description text is "拔草是指消除欲望", the description text includes the first text and the correspondence between the first text and the description text, and the description text is determined as the second text which is specifically "拔草是指消除欲望".

Different pieces of first text may be distinguished and different pieces of second text may be determined correspondingly by defining the correspondence between the first text and the description text. Moreover, the second text includes the first text so as to identify the first text existing in the initial text, reducing the cost of manual identification.

In S304, the initial text is translated to obtain initial translation text, and the second text is translated to obtain description translation text.

In S305, the initial translation text is updated according to the description translation text to obtain target translation text of the initial text.

Optionally, a literal meaning of the first text is different from an actual meaning of the first text.

The literal meaning refers to a meaning determined according to a meaning of each character included in the first text. The actual meaning refers to a correct meaning of the first text or the meaning of the first text in the initial text. The difference between the literal meaning and the actual meaning indicates that the actual meaning of the first text cannot be determined directly according to the meaning of each character included in the first text. Exemplarily, a literal meaning of "饭圈" is a rice circle, while an actual meaning of "饭圈" is a fan group. In another example, a literal meaning of "拔草" is to remove the grass, while an actual meaning of "拔草" is to remove the grass or to eliminate a desire. In another example, a literal meaning of "空 穴来风" is that wind comes when no cave exists, while an actual meaning of "空穴来风" is that wind only comes when a cave exists or that a rumor is well-founded.

A user may pre-collect, for example, words appearing in the network and may also collect a large number of words to automatically screen out high-frequency words to generate a lexicon. The lexicon is pre-collected text. The lexicon is used for determining the first text in the initial text. The lexicon may be understood as a word library. The initial text is matched with the lexicon. Text that is in the lexicon and the same as the initial text is determined as the first text.

The first text with its literal meaning different from its actual meaning is determined in the initial text. With this arrangement, text whose meaning is prone to a wrong detection and which is also easy to translate wrongly is determined in the initial text. Moreover, a targeted correction is performed, optimizing targeted translation and improving translation accuracy.

According to technical solutions of the present disclosure, the paraphrase content of the first text is acquired, the description text of the first text is determined, and the second text is generated based on the description text. With this arrangement, the second text describes the first text accurately. Therefore, the meaning of the first text can be described accurately according to the second text. The initial translation text is updated based on the description translation text of the second text to obtain the target translation text, improving the translation accuracy of the first text in the target translation text and thereby improving the translation accuracy of the target translation text.

Figure 4:
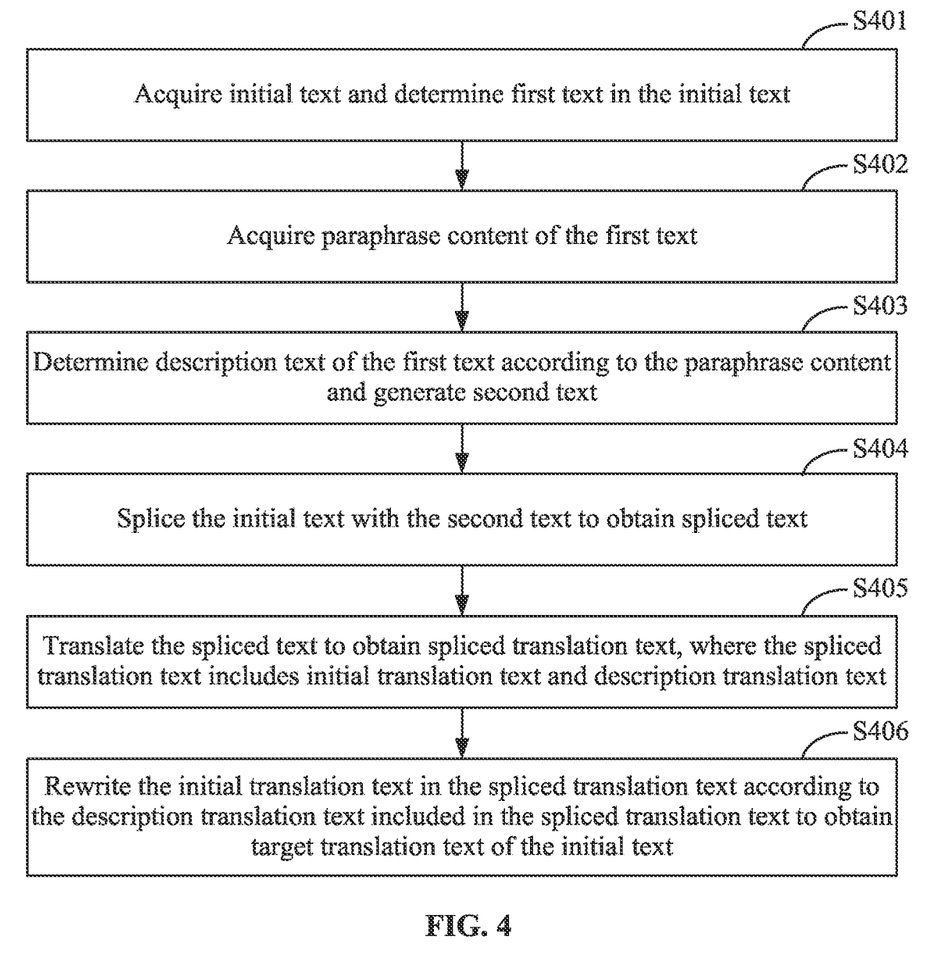
FIG. 4 is a scenario diagram of a text translation method according to an embodiment of the present disclosure.

FIG. 4 is a scenario diagram of a text translation method according to an embodiment of the present disclosure. The text translation method may include the steps below.

In S401, initial text is acquired, and first text is determined in the initial text. A literal meaning of the first text is different from an actual meaning of the first text.

It is queried according to a pre-collected lexicon whether a word in the initial text is the same as a word in the lexicon. The word is determined as the first text. At least one piece of first text may be determined in the initial text. For example, the initial text is "饭圈文化毒害了 青少年一代". The determined first text is "饭圈".

In S402, paraphrase content of the first text is acquired.

The paraphrase content of the first text may be queried through a question-answering system according to the first text. As in a previous example, the paraphrase content is as follows: Fans is short for a fan group in Internet slang; additionally, the English word of "粉丝" is "fans"; and the word fans is composed of fan and s, where s generally indicates a plurality, and fan may be transliterated directly into "饭". A fan group is called "饭". The circle formed by the fan group is called "饭圈" which has a synonym of "饭团".

In S403, description text of the first text is determined according to the paraphrase content, and second text is generated.

The paraphrase content is input into an abstract generation model through the question-answering system so that abstract text, of the paraphrase content, output by the abstract generation model is obtained and determined as the description text of the first text. In the case where the description text includes a correspondence between the first text and the description text, the description text is determined as the second text. In the case where the description text includes no correspondence between the first text and the description text, the correspondence between the first text and the description text is established, and the first text and the description text are added to generate the second text.

As in the previous example, the description text is "饭圈, 网络用语中指粉丝圈子 的简称". The generated second text is "饭圈指粉丝圈子的简称 *".

In S404, the initial text is spliced with the second text to obtain spliced text.

The initial text is placed in the first place. The second text may be placed in sequence according to a sequence of each piece of first text in the initial text. The pieces of text are connected through a comma so that a complete statement is formed and determined as the spliced text.

As in the previous example, the spliced text is "饭圈文化毒害了青少年 一代, 饭圈 指粉丝圈子的简称".

In S405, the spliced text is translated to obtain spliced translation text. The spliced translation text includes initial translation text and description translation text.

The spliced text may be translated through a pre-trained translation model to obtain the spliced translation text. In fact, the spliced text may be translated by using an existing translation model trained on a large-scale data set with no need for retraining.

As in the previous example, the spliced translation text is that "The rice circle culture has poisoned the young generation, The rice circle is short for fan group".

In S406, the initial translation text in the spliced translation text is rewritten according to the description translation text included in the spliced translation text to obtain target translation text of the initial text.

The spliced translation text may be rewritten through a pre-trained rewriting model. For example, the initial translation text is rewritten according to the description translation text so that the rewritten initial translation text is obtained and determined as the target translation text. The rewriting model may be trained with a small amount of monolingual training data, greatly reducing the difficulty of training the rewriting model.

As in the previous example, the target translation text is that "The fan culture has poisoned the young generation".

Figure 5:
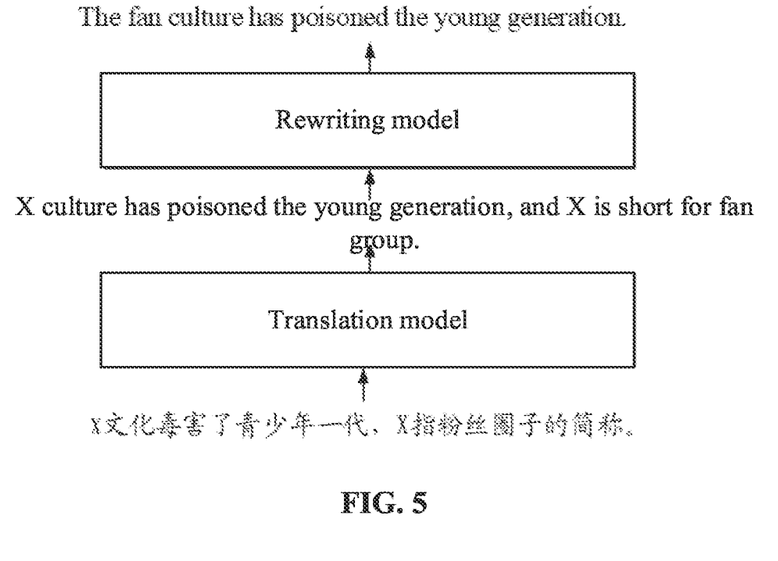
FIG. 5 is a scenario diagram of a text translation method according to an embodiment of the present disclosure.

In embodiments of the present disclosure, an entire process of implementing the text translation method may be defined as a process of processing a translation and rewriting model. The translation and rewriting model may include a translation model and a rewriting model. When the translation and rewriting model is trained, the following operations are performed on training linguistic data (x, y) in which, for example, x is "饭圈文化毒害了青年一代" and y is "The fan culture has poisoned the younger generation": 1. The first text is searched for and replaced (for example, "饭圈" is replaced with placeholder X), and the second text is determined; 2. the replaced initial text and the second text are spliced; 3. the spliced translation text ("X culture has poisoned the younger generation. X is short for fan group.") is generated by using the pre-trained translation model; 4. the spliced translation text and y are taken as an input and an output respectively to serve as a training sample for training the translation and rewriting model. For example, for an application scenario of the text translation method, refer to FIG. 5.

According to technical solutions of the present disclosure, knowledge query and fusion are implemented, greatly improving the timeliness of translating new words and hot words and saving tremendous costs of manual intervention. Through a translation model and a rewrite model, knowledge fusion is implemented and a translation result are made strongly explanatory and more accurate.

Figure 6:
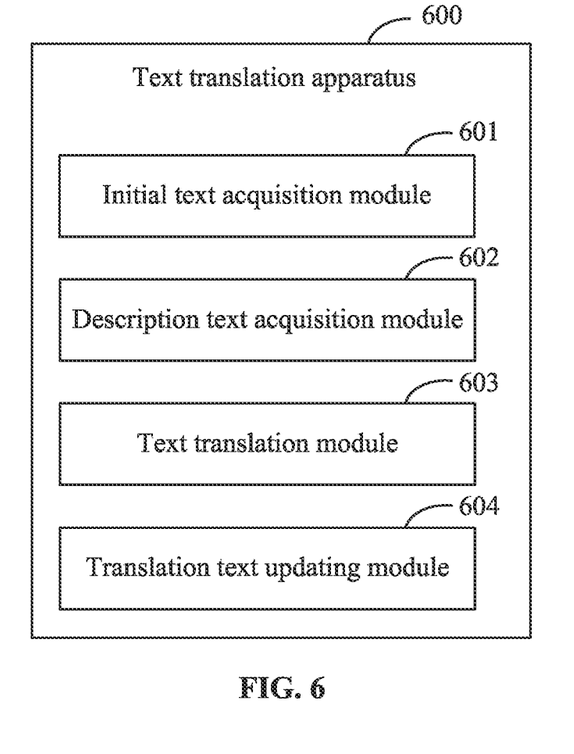
FIG. 6 is a structural diagram of a text translation apparatus according to an embodiment of the present disclosure.

According to embodiments of the present disclosure, FIG. 6 is a structural diagram of a text translation apparatus according to an embodiment of the present disclosure. This embodiment of the present disclosure is applicable to the case of text translation. The apparatus is implemented by software and/or hardware and is specifically configured in an electronic device having a certain data computing capability.

The text translation apparatus 600 shown in FIG. 6 includes an initial text acquisition module 601, a description text acquisition module 602, a text translation module 603, and a translation text updating module 604.

The initial text acquisition module 601 is configured to acquire initial text and determine first text in the initial text.

The description text acquisition module 602 is configured to determine second text according to the first text. The second text is used for describing the first text.

The text translation module 603 is configured to translate the initial text to obtain initial translation text and translate the second text to obtain description translation text.

The translation text updating module 604 is configured to update the initial translation text according to the description translation text to obtain target translation text of the initial text.

According to technical solutions of the present disclosure, the first text in the initial text is acquired, and the second text generated by the description text corresponding to the first text is acquired. The initial text and the second text are translated separately. The initial translation text obtained by translating the initial text is updated based on the description translation text obtained by translating the second text to obtain the target translation text of the initial text. With this arrangement, the translation of the first text in the initial translation text can be updated based on the description content of the first text and the correspondingly-obtained description translation text so that the translation of the first text is determinedly accurately in the initial translation text, improving the accuracy of the translation of the first text, thereby improving the translation accuracy of the target translation text, reducing the cost of manual translation, and improving the timeliness and efficiency of translation.

Further, the text translation module 603 includes a text splicing unit and a spliced text translation unit. The text splicing unit is configured to splice the initial text with the second text to obtain spliced text. The spliced text translation unit is configured to translate the spliced text to obtain spliced translation text. The spliced translation text includes the initial translation text and the description translation text.

Further, the translation text updating module 604 includes a translation text rewrite unit. The translation text rewrite unit is configured to rewrite the initial translation text in the spliced translation text according to the description translation text included in the spliced translation text to obtain the target translation text of the initial text.

Further, the translation text rewrite unit includes a model rewriting sub-unit configured to input the spliced translation text into a pre-trained rewriting model to obtain the target translation text of the initial text and output from the rewriting model.

Further, the description text acquisition module 602 includes a paraphrase content acquisition unit and a description text determination unit. The paraphrase content acquisition unit is configured to acquire paraphrase content of the first text. The description text determination unit is configured to determine description text of the first text according to the paraphrase content and generate the second text.

Further, the second text includes a correspondence between the first text and the description text.

Further, a literal meaning of the first text is different from an actual meaning of the first text.

The preceding text translation apparatus may perform the text translation method according to any embodiment of the present disclosure and has function modules and beneficial effects corresponding to the execution of the text translation method.

In technical solutions of the present disclosure, the collection, storage, use, processing, transmission, provision, and disclosure of user personal information involved are in compliance with provisions of relevant laws and regulations and do not violate public order and good customs.

According to embodiments of the present disclosure, the present disclosure further provides an electronic device, a readable storage medium, and a computer program product.

Figure 7:
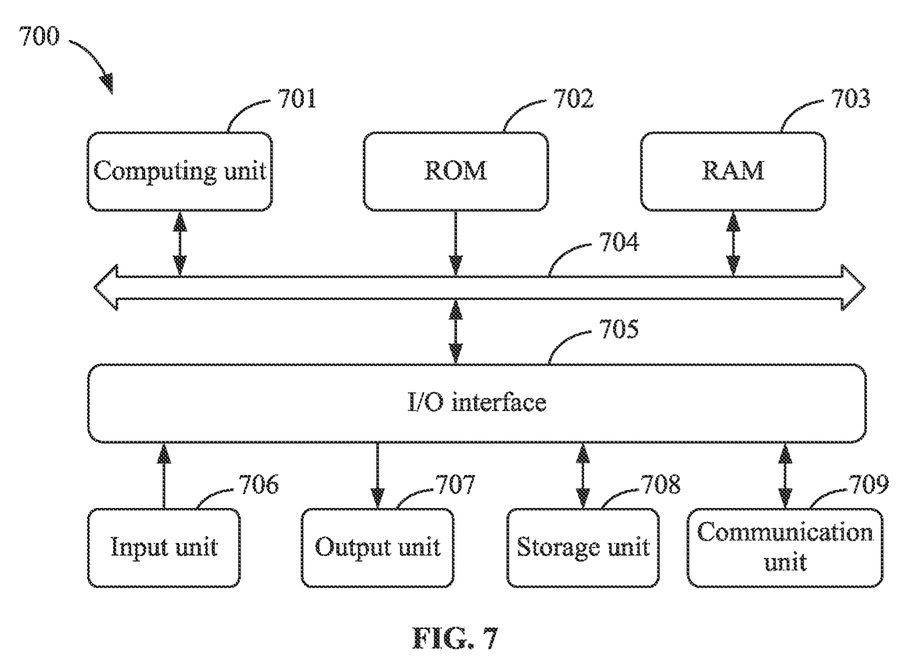
FIG. 7 is a block diagram of an electronic device for performing a text translation method according to an embodiment of the present disclosure.

FIG. 7 is a block diagram of an example electronic device 700 for implementing an embodiment of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 7, the device 700 includes a computing unit 701. The computing unit 701 may perform various types of appropriate operations and processing based on a computer program stored in a read-only memory (ROM) 702 or a computer program loaded from a storage unit 708 to a random-access memory (RAM) 703. Various programs and data required for operations of the device 700 may also be stored in the RAM 703. The computing unit 701, the ROM 702, and the RAM 703 are connected to each other through a bus 704. An input/output (I/O) interface 705 is also connected to the bus 704.

Multiple components in the device 700 are connected to the I/O interface 705. The multiple components include an input unit 706 such as a keyboard and a mouse, an output unit 707 such as various types of displays and speakers, the storage unit 708 such as a magnetic disk and an optical disk, and a communication unit 709 such as a network card, a modem and a wireless communication transceiver. The communication unit 709 allows the device 700 to exchange information/data with other devices over a computer network such as the Internet and/or over various telecommunication networks.

The computing unit 701 may be a general-purpose and/or special-purpose processing component having processing and computing capabilities. Examples of the computing unit 701 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller and microcontroller. The computing unit 701 executes various methods and processing described above, such as the text translation method. For example, in some embodiments, the text translation method may be implemented as a computer software program tangibly contained in a machine-readable medium such as the storage unit 708. In some embodiments, part or all of computer programs may be loaded and/or installed on the device 700 via the ROM 702 and/or the communication unit 709. When the computer program is loaded to the RAM 703 and executed by the computing unit 701, one or more steps of the preceding text translation method may be executed. Alternatively, in other embodiments, the computing unit 701 may be configured, in any other suitable manner (for example, by means of firmware), to perform the text translation method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device and the at least one output device.

Program codes for implementation of the methods of the present disclosure may be written in one programming language or any combination of multiple programming languages. The program codes may be provided for the processor or controller of a general-purpose computer, a special-purpose computer, or another programmable data processing apparatus to enable functions/operations specified in flowcharts and/or regional diagrams to be implemented when the program codes are executed by the processor or controller. The program codes may be executed entirely on a machine, partly on a machine, as a stand-alone software package, partly on a machine and partly on a remote machine, or entirely on a remote machine or a server.

In the context of the present disclosure, the machine-readable medium may be a tangible medium that may include or store a program that is used by or in conjunction with a system, apparatus or device that executes instructions. The machine-readable medium may be a machine-readable signal medium or a machine-readable storage medium. The machine-readable medium may include, but is not limited to, an electronic, magnetic, optical, electromagnetic, infrared, or semiconductor system, apparatus or device or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device for displaying information to the user, such as a cathode-ray tube (CRT) or a liquid-crystal display (LCD) monitor, and a keyboard and a pointing device such as a mouse or a trackball through which the user can provide input for the computer. Other types of devices may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), and the Internet.

The computing system may include clients and servers. The clients and the servers are usually far away from each other and generally interact through the communication network. The relationship between the clients and the servers arises by virtue of computer programs running on respective computers and having a client-server relationship to each other. A server may be a cloud server, a server of a distributed system, or a server combined with a blockchain.

It is to be understood that various forms of the preceding flows may be used, with steps reordered, added, or removed. For example, the steps described in the present disclosure may be executed in parallel, in sequence, or in a different order as long as the desired results of the technical solutions disclosed in the present disclosure are achieved. The execution sequence of these steps is not limited herein.

The scope of the present disclosure is not limited to the preceding embodiments. It is to be understood by those skilled in the art that various modifications, combinations, sub-combinations, and substitutions may be made depending on design requirements and other factors. Any modifications, equivalent substitutions, improvements, and the like made within the spirit and principle of the present disclosure are within the scope of the present disclosure.

What is claimed is:

1. A text translation method, executed by an electronic device and comprising:
acquiring initial text and determining first text in the initial text;
determining second text according to the first text, wherein the second text is used for describing the first text;
translating, using a neural network model, the initial text to obtain initial translation text and translating, using the neural network model, the second text to obtain description translation text; and
updating, using the neural network model, the initial translation text according to the description translation text to obtain target translation text of the initial text;
wherein translating, using the neural network model, the initial text to obtain the initial translation text and translating, using the neural network model, the second text to obtain the description translation text comprises:
placing the initial text and the second text in a same statement in which the second text is placed behind the initial text and separating the initial text and the second text by a symbol separating pieces of text to obtain spliced text; and
translating, using the neural network model, the spliced text to obtain spliced translation text, wherein the spliced translation text comprises the initial translation text and the description translation text; wherein in the spliced translation text, the initial translation text and the description translation text are placed in a same statement in which the description translation text is placed behind the initial translation text; and
wherein in the spliced translation text, the initial translation text and the description translation text are separated by the symbol separating pieces of text; or
wherein translating, using the neural network model, the initial text to obtain the initial translation text and translating, using the neural network model, the second text to obtain the description translation text comprises:
placing the initial text and the second text in a same paragraph in which the second text is placed behind the initial text and separating the initial text and the second text by a symbol separating pieces of text to obtain spliced text; and
translating, using the neural network model, the spliced text to obtain spliced translation text, wherein the spliced translation text comprises the initial translation text and the description translation text; wherein in the spliced translation text, the initial translation text and the description translation text are placed in a same paragraph in which the description translation text is placed behind the initial translation text; and wherein in the spliced translation text, the initial translation text and the description translation text are separated by the symbol separating pieces of text.

2. The method according to claim 1, wherein updating, using the neural network model, the initial translation text according to the description translation text to obtain the target translation text of the initial text comprises:
rewriting, using the neural network model, the initial translation text in the spliced translation text according to the description translation text comprised in the spliced translation text to obtain the target translation text of the initial text.

3. The method according to claim 2, wherein the neural network model comprises a pre-trained rewriting model and rewriting, using the neural network model, the initial translation text in the spliced translation text according to the description translation text comprised in the spliced translation text to obtain the target translation text of the initial text comprises:
inputting the spliced translation text into the pre-trained rewriting model to obtain the target translation text of the initial text and output from the rewriting model.

4. The method according to claim 1, wherein determining the second text according to the first text comprises:
acquiring paraphrase content of the first text; and
determining description text of the first text according to the paraphrase content and generating the second text.

5. The method according to claim 4, wherein the second text comprises a correspondence between the first text and the description text.

6. The method according to claim 1, wherein a literal meaning of the first text is different from an actual meaning of the first text.

7. A text translation apparatus, comprising:
at least one processor; and
a memory communicatively connected to the at least one processor,
wherein the memory stores an instruction executable by the at least one processor, and the instruction is executed by the at least one processor to cause the at least one processor to perform steps in the following modules:
an initial text acquisition module configured to acquire initial text and determine first text in the initial text;
a description text acquisition module configured to determine second text according to the first text, wherein the second text is used for describing the first text;
a text translation module configured to translate, using a neural network model, the initial text to obtain initial translation text and translate, using the neural network model, the second text to obtain description translation text; and
a translation text updating module configured to update, using the neural network model, the initial translation text according to the description translation text to obtain target translation text of the initial text;
wherein the text translation module comprises:
a text splicing unit configured to place the initial text and the second text in a same statement in which the second text is placed behind the initial text and separate the initial text and the second text by a symbol separating pieces of text to obtain spliced text; and
a spliced text translation unit configured to translate, using the neural network model, the spliced text to obtain spliced translation text, wherein the spliced translation text comprises the initial translation text and the description translation text; wherein in the spliced translation text, the initial translation text and the description translation text are placed in a same statement in which the description translation text is placed behind the initial translation text; and wherein in the spliced translation text, the initial translation text and the description translation text are separated by the symbol separating pieces of text; or wherein the text translation module comprises:
a text splicing unit configured to place the initial text and the second text in a same paragraph in which the second text is placed behind the initial text and separate the initial text and the second text by a symbol separating pieces of text to obtain spliced text; and a spliced text translation unit configured to translate, using the neural network model, the spliced text to obtain spliced translation text, wherein the spliced translation text comprises the initial translation text and the description translation text; wherein in the spliced translation text, the initial translation text and the description translation text are placed in a same paragraph in which the description translation text is placed behind the initial translation text; and wherein in the spliced translation text, the initial translation text and the description translation text are separated by the symbol separating pieces of text.

8. The apparatus according to claim 7, wherein the translation text updating module comprises:
a translation text rewrite unit configured to rewrite, using the neural network model, the initial translation text in the spliced translation text according to the description translation text comprised in the spliced translation text to obtain the target translation text of the initial text.

9. The apparatus according to claim 8, wherein the neural network model comprises a pre-trained rewriting model and the translation text rewrite unit comprises:
a model rewriting sub-unit configured to input the spliced translation text into the pre-trained rewriting model to obtain the target translation text of the initial text and output from the rewriting model.

10. The apparatus according to claim 7, wherein the description text acquisition module comprises:
a paraphrase content acquisition unit configured to acquire paraphrase content of the first text; and
a description text determination unit configured to determine description text of the first text according to the paraphrase content and generate the second text.

11. The apparatus according to claim 10, wherein the second text comprises a correspondence between the first text and the description text.

12. The apparatus according to claim 7, wherein a literal meaning of the first text is different from an actual meaning of the first text.

13. A non-transitory computer-readable storage medium storing a computer instruction for causing a computer to perform the following steps:
acquiring initial text and determining first text in the initial text;
determining second text according to the first text, wherein the second text is used for describing the first text;
translating, using a neural network model, the initial text to obtain initial translation text and translating, using the neural network model, the second text to obtain description translation text; and
updating, using the neural network model, the initial translation text according to the description translation text to obtain target translation text of the initial text;
wherein translating, using the neural network model, the initial text to obtain the initial translation text and translating, using the neural network model, the second text to obtain the description translation text comprises:
placing the initial text and the second text in a same statement in which the second text is placed behind the initial text and separating the initial text and the second text by a symbol separating pieces of text to obtain spliced text; and
translating, using the neural network model, the spliced text to obtain spliced translation text, wherein the spliced translation text comprises the initial translation text and the description translation text; wherein in the spliced translation text, the initial translation text and the description translation text are placed in a same statement in which the description translation text is placed behind the initial translation text; and
wherein in the spliced translation text, the initial translation text and the description translation text are separated by the symbol separating pieces of text;
wherein translating, using the neural network model, the initial text to obtain the initial translation text and translating, using the neural network model, the second text to obtain the description translation text comprises:
placing the initial text and the second text in a same paragraph in which the second text is placed behind the initial text and separating the initial text and the second text by a symbol separating pieces of text to obtain spliced text; and
translating, using the neural network model, the spliced text to obtain spliced translation text, wherein the spliced translation text comprises the initial translation text and the description translation text; in the spliced translation text, wherein the initial translation text and the description translation text are placed in a same paragraph in which the description translation text is placed behind the initial translation text; and
wherein in the spliced translation text, the initial translation text and the description translation text are separated by the symbol separating pieces of text.

14. The medium according to claim 13, wherein updating, using the neural network model, the initial translation text according to the description translation text to obtain the target translation text of the initial text comprises:
rewriting, using the neural network model, the initial translation text in the spliced translation text according to the description translation text comprised in the spliced translation text to obtain the target translation text of the initial text.

15. The medium according to claim 14, wherein the neural network model comprises a pre-trained rewriting model and rewriting, using the neural network model, the initial translation text in the spliced translation text according to the description translation text comprised in the spliced translation text to obtain the target translation text of the initial text comprises:
inputting the spliced translation text into the pre-trained rewriting model to obtain the target translation text of the initial text and output from the rewriting model.

16. The medium according to claim 13, wherein determining the second text according to the first text comprises:
acquiring paraphrase content of the first text; and
determining description text of the first text according to the paraphrase content and generating the second text.

17. The medium according to claim 16, wherein the second text comprises a correspondence between the first text and the description text.

* * * * *